(12) United States Patent
Boussad

(10) Patent No.: US 6,384,112 B1
(45) Date of Patent: May 7, 2002

(54) EMULSIFIED BITUMINOUS BINDER

(75) Inventor: Nadjib Boussad, Notre Dame de Gravenchon (FR)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/485,202

(22) PCT Filed: Aug. 5, 1998

(86) PCT No.: PCT/EP98/04875

§ 371 Date: May 8, 2000

§ 102(e) Date: May 8, 2000

(87) PCT Pub. No.: WO99/07792

PCT Pub. Date: Feb. 18, 1999

(30) Foreign Application Priority Data

Aug. 11, 1997 (FR) .............................. 97 10267

(51) Int. Cl.⁷ .............................. C08L 95/00
(52) U.S. Cl. ................ 524/71; 106/271; 106/273.1; 106/277; 106/278; 524/59; 524/60; 524/61; 524/68; 524/69

(58) Field of Search ............................ 106/271, 273.1, 106/277, 278; 524/59, 60, 61, 68, 69, 71

(56) References Cited

U.S. PATENT DOCUMENTS

| 4,591,531 A | * | 5/1986 | Uffner | 524/69 |
| 4,738,998 A | * | 4/1988 | Uffner et al. | 524/69 |
| 5,120,355 A | * | 6/1992 | Imai | 106/271 |

* cited by examiner

*Primary Examiner*—Peter Szekely
(74) *Attorney, Agent, or Firm*—Joseph J. Allocca

(57) ABSTRACT

A bitumen emulsion comprising bituminous binder, emulsifier, and water. The bituminous binder comprises bitumen and an oxidised wax, and optionally one or more polymers. The incorporation of the oxidised wax into the bituminous binder provides modified bitumen with both a high softening point and a low enough viscosity to allow it to be emulsified. The emulsion may be used as a tack coat in applying a waterproofing layer to a roof base. The emulsion may be made using a static mixing emulsion process.

9 Claims, No Drawings

EMULSIFIED BITUMINOUS BINDER

The present invention relates to a bitumen emulsion composition useful, for example, in the binding of bituminous waterproofing layers to substrates such as roof bases.

Conventionally, before applying a bituminous waterproofing layer to a substrate such as a roof base comprising, for example, iron, steel, or concrete, the substrate must first be coated with a tackifying substance, or tack coat, which acts to bond the bituminous waterproofing layer to the substrate. The waterproofing layer is then applied, and the tack coat and waterproofing layer heated together to achieve bonding to the substrate. The tack coat typically comprises a polymer-modified bitumen composition containing a substantial proportion, e.g. 40–60 wt %, of light flux(es) the flux being required to reduce the viscosity of the bitumen to enable it to be applied to the substrate. After applying the tack coat to the substrate a delay is incurred before the waterproofing layer can be applied as the flux must first be allowed to evaporate. Even so, there is a likelihood that some of this highly inflammable flux may still be present, causing potential health and safety hazards to roofing operators when the tack coat is heated. There is therefore a need for a tack coat composition which reduces the delay caused by the evaporating flux and minimises the dangers when heating the tack coat.

One solution might be to use a bitumen emulsion for the tack coat. An emulsion has the advantage that it is already in a form suitable for cold (ie. ambient temperature) application onto a substrate, and therefore no flux is required. Therefore there is little or no delay in applying the waterproofing layer after the application of the tack coat, i.e. no need to wait for the flux to evaporate, and the danger of using inflammable flux is removed.

However, because of the high temperatures that waterproofing composites may be subjected to during their lifetime it is important that the bitumen binder used for the tack coat has a high softening point, for example, for roofing applications the softening point should typically be at least 80° C., preferably at least 90° C., and more preferably 100° C. or higher. However, bitumens with a high softening point also tend to have high viscosities at elevated temperatures making them difficult to emulsify. An alternative route is the use of polymers to modify the bitumen, but they also tend to increase the viscosity of the bitumen making it difficult to emulsify.

Accordingly there is a need for a bituminous binder which has a viscosity low enough for it to be emulsified, but a softening point high enough to withstand the temperatures occurring in uses such as tack coats in binding a waterproofing bituminous layer to a substrate.

The present invention provides an oil-in-water emulsion comprising:
(a) from 30 to 70 wt % of a bituminous binder having a penetration of from 40 to 150 mm/10 (ASTM D5), a softening point from 60 to 120° C. (ASTM D36) and a kinematic viscosity at 160° C. of less than 250 mm²/s, preferably from 150 to 250 mm²/s (ASTM D2170), the binder comprising from 88 to 99.5 wt % bitumen having a penetration of from 70 to 300 mml/10 and a softening point from 30 to 50° C., and from 0.5 to 12 wt % of an oxidised wax;
(b) from 0.01 to 5 wt % emulsifier; and
(c) from 25 to 69.9 wt % water.

The oxidised wax is preferably derived from a high density polyethylene wax, for example by air oxidation of a high density polyethylene wax. Preferably the oxidised wax has a melting point of from 100 to 150° C. (ASTM D3418) more preferably from 120 to 140° C., a dynamic viscosity at 150° C. from 200 to 10000 mPa.s measured using a Brookfield viscometer, and an acid number of from 10 to 50 mg KOH/g (ASTM D1386).

Commercially available examples of such oxidised wax are LUWAX OA3 available from BASF, and A-C 316 and A-C 330 waxes available from Allied Signal. LUWAX, A-C 316 and A-C 330 are trade names.

The bituminous binder used in the emulsion according to the invention has the advantage that it is of low enough viscosity to enable it to be emulsified whilst having a high enough softening point to withstand the high temperatures likely to occur in applications such as roofing applications. These properties are achieved by the incorporation of the oxidised wax into the bituminous binder. A polyethylene wax, more especially an oxidised high density polyethylene wax, is characterised by a high melting point and low melt viscosity; the wax thus modifies the properties of the bituminous binder in which it is incorporated and enables the binder to have a high softening point without a correspondingly high viscosity at high temperature. In addition it is believed that the polar functionality of the wax due to its oxidised state improves the compatibility of the wax with the bituminous binder and further facilitates the emulsification of the binder.

It is preferred to incorporate one or more polymers into the bituminous binder according to the invention to improve the mechanical performance of the bituminous binder over a wide temperature range, for example tensile resistance, cohesion, low temperature flexibility. Preferably the total amount of polymer material contained in the binder, other than the oxidised wax, is from 0.5 to 10 wt % based on the total weight of the binder.

The polymers may be elastomers or plastomers and are selected from styrene-alkadiene copolymers, α-olefin copolymers, alkylene-vinyl acetate copolymers, alkylene-acrylate copolymers and alkylene-alkylacrylate copolymers, or a mixture of two or more thereof. Beneficially the emulsion contains from 0.1 to 6 wt %, preferably from 1 to 4 wt % of an elastomer selected from styrene-alkadiene-styrene copolymers, and from 0.1 to 10 wt %, preferably from 1 to 6 wt % of a plastomer selected from alkylene-vinyl acetate copolymers, alkylene-acrylate copolymers and alkylene-alkylacrylate copolymers, wherein the alkylene monomer preferably contains from 1 to 5 carbon atoms, the weight percents being based on the total weight of the bituminous binder.

Examples of suitable styrene-alkadiene copolymers for the elastomer include styrene-butadiene block copolymer ("SBS") and styrene-isoprene block copolymer, with SBS being a preferred copolymer. The molar proportion of styrene:butadiene is typically in the range from 20:80 to 45:55, and the molecular weight of the SBS typically is in the range from 50,000 to 150,000.

Examples of suitable copolymers for the plastomer include ethylene-vinyl acetate copolymer ("EVA"), ethylene-methacrylate copolymer ("EMA") and ethylene-methylmethacrylate ("EMMA"), with EVA being a preferred copolymer. Preferably the vinyl acetate content of the EVA is from 10 to 30 mole percent, and the EVA preferably has a melt index of from 100 to 4,000. The molecular weight of the plastomer is preferably from 5,000 to 50,000, more preferably from 10,000 to 30,000.

The bitumen employed in the emulsion may be obtained from a variety of sources including straight-run vacuum residue; mixtures of vacuum residue with diluents such as vacuum tower wash oil, paraffin distillate, aromatic and naphthenic oils and mixtures thereof; oxidised vacuum residues or oxidised mixtures of vacuum residues and diluent oils and the like. Typically, the bitumen will have an atmospheric boiling point of at least 380° C., a penetration (mm/10) from 70 to 300, preferably 150 to 250, at 25° C. (Standard Test ASTM D5), a softening point (Ring and Ball) from 30 to 50° C., preferably 35 to 50° C. (ASTM D36 ), and a kinematic viscosity from 100 to 500 mm$^2$/s at 135° C. (ASTM D2170). A mixture of two or more different bitumens may be used.

The amount of emulsifier employed may range from 0.1 to 5 weight percent, but usually an amount from 0.1 to 2 wt %, more preferably 0.1 to 1 wt % is employed, depending upon the type of emulsifier, as would be readily determined by the skilled person. The emulsifier may be cationic, anionic or non-ionic, or a mixture of cationic and non-ionic, or anionic and non-ionic emulsifiers, depending upon the desired electrochemical properties of the emulsion and the intended use of the emulsion, for example the type of surface on which the emulsion is to be applied as a tack coat.

Suitable cationic emulsifiers include fatty amines, fatty amido-amines, ethoxylated amines, imidoazalines, quarternary ammonium salts, and mixtures thereof. Preferably the cationic emulsifier is a diamine, for example tallow propylene diamine, and more preferably is a mixture of a diamine with a quarternary ammonium salt. When a cationic emulsifier is employed, it is preferred to include an acid in the bitumen emulsion to counteract the alkalinity of the emulsifier. Generally acid is added to adjust the pH of the emulsion to approximately pH 2 to 7. Typically from 0.01 to 1 wt % acid based on the total weight of the emulsion is added. Suitable acids include inorganic acids, for example hydrochloric acid.

Suitable anionic emulsifiers include long chain carboxylic and sulphonic acids, their salts and mixtures thereof.

Suitable non-ionic emulsifiers include ethoxylated compounds, for example ethoxylates of sorbitan esters, alcohols and alkyl phenols, and mixtures thereof.

The emulsion according to the invention may contain other additives well known to those skilled in the art of bitumen emulsions to adjust the emulsion properties in relation to the foreseen use, method of application, and storage conditions. These include, for example, mineral salts, thickening agents, anti-freeze agents and the like.

The bituminous binder may be prepared by first mixing the optional polymers into the bitumen with a high efficiency stirrer, at a temperature typically inside the range 160 to 200° C., for a time long enough to ensure dispersion and swelling of the polymers, as it is well known to those skilled in the art of polymer bitumen modification, then adding the oxidised wax and continuing with the mixing, generally for not more than 1 hour.

The emulsion may be prepared by any suitable emulsification process but is preferably prepared by a static mixing process as disclosed in published European Patent Application 283246A. The process preferably comprised the following steps:

a) feeding the bituminous binder into a first static mixer at a temperature above 100° C.;

b) introducing water under pressure into the first static mixer, the pressure being sufficient to prevent substantial vaporization of the water, the weight ratio of bitumen to water in the first static mixer being between 2:1 and 15:1, preferably between 2:1 and 10:1;

c) introducing the emulsifier into the first static mixer;

d) mixing the components in the first static mixer, and then passing the resultant mixture form the first static mixer into at least one other mixer in which the temperature is below the boiling point of water;

e) introducing water into the other mixer(s) in an amount such that the total amount of water present in the resulting emulsion is from 25 to 69.9% by weight based on the total weight of the emulsion; and f) passing the mixture through the other mixer(s) and removing the resulting bitumen emulsion.

Preferably the said other mixer is also a static mixer.

To facilitate the introduction of the emulsifier into the first static mixer, the emulsifier, in part or in total, may be mixed with the water to be added to the first mixer to form an aqueous solution or "soap". If desired, the bitumen may be premixed with the water and/or the emulsifying agent prior to introduction into the first mixer.

The bitumen is preferably introduced into the first static mixer at a temperature of 100 to 200° C., more preferably 130 to 200° C., and at a pressure of 2 to 80 bars, more preferably 10 to 50 bars. The water or soap is preferably introduced into the same mixer at a temperature of 20 to 90° C., more preferably 50 to 80° C., and also at a pressure of 2 to 80 bars, more preferably 10 to 50 bars. The temperature in the first mixer is usually 70 to 200° C., more preferably 100 to 160° C. A high temperature facilitates the emulsification of the bitumen and water, and the relatively high pressure prevents the water from boiling.

It is preferred to pass the resultant mixture from the first static mixer directly into the other mixer, which is also preferably a static mixer. The remainder of the water is introduced into this other mixer, preferably cold, for example 5 to 20° C., so that it cools the emulsion enabling the resultant emulsion to exit the other mixer below the boiling point of water. It is also advantageous to operate this other mixer at a reduced pressure relative to the first mixer so that the emulsion emerges from the other mixture at atmospheric pressure.

Any other additives that are to be included in the emulsion may be added at any state during the process, although are preferably added to the first static mixer to ensure thorough mixing, and conveniently are added at the same time as the emulsifier.

The process is preferably a two-mixer process, but more than two mixers may be used. These additional mixers may be static mixers or other types of mixers, such as a colloid mill. Examples of suitable static mixers are those known as Sulzer or Kenics mixers, which are well known to those skilled in the art of static mixing.

The above-described static mixing process has the advantage that it produces an emulsion wherein the bitumen droplets are of a small particle size and relatively narrow size distribution. Typically the bitumen droplets have a median particle size of from 1 to 8 micrometres ($\mu$m), preferably from 2 to 7 $\mu$m, with a standard deviation of no more than 0.3 (measured using a Coulter® Multisizer particle size analyser). This has the advantage that the resulting emulsion is storage stable, but, once applied to a substrate, breaks relatively rapidly and uniformly.

The bitumen emulsion according to the invention is beneficially used as a tack coat for bonding a bituminous waterproofing layer to a roof base, although may find use in any other similar applications where a binder is needed to bond two substrates or materials together. The bitumen emulsion may be applied to the substrate using any suitable technique, for example by spraying.

The invention shall now be illustrated by the following Example:

EXAMPLE

A series of polymer-modified bituminous binders were prepared using one or more of the following components as detailed in Table 1 below:

bitumen of penetration grade, softening point and viscosity as shown in Table 1 a linear styrene-butadiene ("SBS") block copolymer having a styrene: butadiene molar ration of 31:69, and a weight average molecular weight of 100,000;

an ethylene-vinyl acetate ("EVA 1") copolymer of melt index 3000 g/10 min (ASTM D1238), 14 wt % vinyl acetate content, and a weight average molecular weight of 14,000;

a low molecular weight ethylene-vinyl acetate ("EVA 2") copolymer of Brookfield viscosity 450 mPa.s at 150° C., a 13 wt % vinyl acetate content, and a weight average molecular weight of 5,500; and an oxidised high density polyethylene wax of melting point 128° C. (ASTM D3414), Brookfield viscosity 3800 mPa.s at 150° C., and acid number 22 mg KOH/g (ASTM D1386), produced by air oxidation of a high density polyethylene wax of molecular weight 9,000.

The components were blended with a turbine stirrer operating at 175° C. for 2 to 4 hours in order to obtain an homogenous blend.

The resulting polymer-modified bituminous binders were then emulsified according to the static mixing process described above to produce cationic emulsions of 60 to 70 wt % binder content. To produce the emulsion a soap was first prepared by mixing water and a commercially available emulsifier, namely a tallow propylene diamine saponified with hydrochloric acid of specific gravity 1.16, the content of acid being adjusted to obtain the desired pH value. The amounts of the components contained in the soap are given in Table 2 below. The polymer-modified bituminous binder and the soap were injected into a first static mixer operating under the conditions shown in Table 2. The resulting mix was then passed into a second static mixer operating under the conditions also shown in Table 2 to which a further amount of water was added, as indicated in Table 2.

Where a satisfactory emulsion was obtained, ie. where the emulsification process had not failed because the viscosity of bituminous binder was too high, the emulsion was tested for particle size distribution and storage stability. Particle size distribution is determined by means of a Coulter® Multisizer: the median particle size $d_{50}$ means that 50 mass % of the binder is in particles of diameter lower than $d_{50}$; the size variation is obtained by the formula "0.5 log($d_{84}/d_{16}$)" with $d_{84}$ and $d_{16}$ having the same significance as $d_{50}$. Storage stability is expressed by the % settling at the bottom of a 100 mm high flask containing the emulsion and stored for 7 days at 25° C., except for Example reference H where storage was maintained for 50 days under the same conditions.

Referring to Table 1 it can be seen that binder A which consists solely of a hard grade bitumen is of a low enough viscosity to be emulsified but does not have a high enough softening point ($\geq 60°$ C. in general) to withstand the high temperatures occurring in applications such as tack coat in binding a waterproofing bituminous layer to a substrate, for example a roof base. Conversely binder B has a high enough softening point at 85° C. for such high temperature applications but is too viscous to be satisfactorily emulsified. Binders C to H all comprise polymer-modified bitumen, the bitumen being a penetration grade 180/220. Binders E and F each contains bitumen and polymer but no oxidised wax. They each have acceptably high softening points but are too viscous to be emulsified. Binders C, G and H have added oxidised wax, providing the binders with comparable, acceptably high softening points to binders E and F, but with significantly reduced viscosities enabling these binders to be emulsified.

TABLE 1

Composition and Characteristics of Modified Bituminous Binders

| Binder Reference | | A | B | C | D | E | F | G | H |
|---|---|---|---|---|---|---|---|---|---|
| Binder Composition | | | | | | | | | |
| Bitumen Pen Grade | $10^{-1}$ mm | 35/50 | — | 180/220 | 180/220 | 180/220 | 180/220 | 180/220 | 180/220 |
| Bitumen Blown Grade | | | 85/25 | | | | | | |
| Bitumen | mass % | 100 | 100 | 92 | 88 | 86 | 95 | 90 | 90 |
| EVA 1 | " | — | — | 6 | 6 | 6 | — | 5 | 4 |
| SBS | " | — | — | — | — | 2 | 5 | 2 | 2 |
| EVA 2 | " | — | — | — | 6 | 6 | — | — | — |
| Oxidised HDPE wax | " | — | — | 2 | — | — | — | 3 | 4 |
| Binder Properties | | | | | | | | | |
| Softening Point | ° C. | 53 | 85 | 81 | 78 | 83 | 95 | 89 | 104 |
| Penetration at 25° C. | $10^{-1}$ mm | 41 | 25 | 72 | 59 | 79 | — | 66 | 63 |
| Viscosity at 160° C. | mm²/s | 183 | 1150 | 216 | 196 | 315 | 450 | 215 | 190 |
| Emulsibility* | | OK | Fails | OK | OK | Fails | Fails | OK | OK |

*Emulsibility is defined in this instance to mean that the resulting mixture was an emulsion that was storage stable at 25° C. for at least 7 days.

TABLE 2

Manufacture and Properties of Emulsions

| Emulsion Reference | | 1 | 2 | 3 | 4 | 5 |
|---|---|---|---|---|---|---|
| Binder reference | | A | D | G | H | H |
| Emulsion Composition | | | | | | |
| Binder amount | mass % | 65.5 | 58.5 | 59.9 | 59.9 | 60.00 |
| Water 1st mixer | " | 10.5 | 13.0 | 12.4 | 12.4 | 12.45 |
| Emulsifier | " | 0.6 | 0.5 | 0.5 | 0.5 | 0.50 |
| Acid (sp gr 1.16) | " | 0.4 | 0.4 | 0.4 | 0.4 | 0.38 |
| Water 2nd mixer | " | 23.0 | 27.6 | 26.8 | 26.8 | 26.70 |
| Operating Parameters | | | | | | |
| Binder Temperature | ° C. | 164 | 159 | 163 | 163 | 165 |
| Pressure 1st mixer | $10^5$ Pa | 32 | 27 | 32 | 31 | 42 |
| Temperature 1st mixer | ° C. | 138 | 127 | 132 | 132 | 139 |
| Pressure 2nd mixer | $10^5$ Pa | 7 | 5 | 5 | 5 | 13 |
| Temperature 2nd mixer | ° C. | 90 | 83 | 83 | 86 | 88 |
| Emulsion Properties | | | | | | |
| Binder content | mass % | 66.5 | 58.5 | 58.2 | 59.8 | 60.0 |
| pH | | 3.1 | 2.2 | 2.4 | 2.4 | 2.6 |

TABLE 2-continued

Manufacture and Properties of Emulsions

| | | | | | | |
|---|---|---|---|---|---|---|
| Median particle size $d_{50}$(*) | μm | 4.71 | 5.32 | 6.55 | 6.64 | 3.48 |
| Size variation | | 0.25 | 0.28 | 0.26 | 0.27 | 0.32 |
| Settling after 7 days | % | 0 | — | 0 | 0 | 0.04 (50 days) |

(*)Coulter ® Multisizer, 70 μm cell

What is claimed is:

1. An oil-in-water emulsion comprising by weight based on the weight of the emulsion:
    (a) from 30 to 70 wt % of a bituminous binder having a penetration of from 40 to 150 mm/10 (ASTM D5), a softening point from 60 to 120° C. (ASTM D36) and a kinematic viscosity at 160° C. less than 250 mm²/s (ASTM D2170), the binder comprising from 88 to 99.5 wt % bitumen having a penetration of from 70 to 300 mm/10 and a softening point from 30 to 50° C., and from 0.5 to 12 wt % of an oxidised high density polyethylene wax having a melting point in the range from 100° C. to 150° C.;
    (b) from 0.01 to 5 wt % emulsifier; and
    (c) from 25 to 69.9 wt % water.

2. An emulsion according to claim 1 wherein said oxidised high density polyethylene wax has a Brookfield dynamic viscosity at 150° C. from 200 to 10,000 mPa.s, and an acid number from 10 to 50 mg KOH/g.

3. An emulsion according to claim 1 wherein the bituminous binder also comprises from 0.1 to 6 wt % of a styrene-alkadiene copolymer.

4. An emulsion according to claim 2, wherein the bituminous binder also comprises from 0.1 to 6 wt % of a styrene-alkadiene copolymer.

5. An emulsion according to claim 3 wherein the styrene-alkadiene copolymer is a styrene-butadiene ("SBS") copolymer.

6. An emulsion according to claim 5 wherein the bituminous binder also comprises from 0.1 to 10 wt % of a copolymer selected from alkylene-vinyl actetate copolymers, alkylene-acrylate copolymers and alkylene-alkylacrylate copolymers.

7. An emulsion according to claim 6 wherein the said copolymer is ethylene-vinyl acetate.

8. A method for preparing an emulsion according to claim 1, 2, 3, 5, 6, 7, or 4 comprising:
    a) feeding the bituminous binder into a first static mixer at a temperature above 100° C.;
    b) introducing water under pressure into the first static mixer, the pressure being sufficient to prevent substantial vaporisation of the water, the weight ratio of bitumen to water in the first static mixer being between 2:1 and 15:1;
    c) introducing the emulsifier into the first static mixer;
    d) mixing the components in the first static mixer, and then passing the resultant mixture from the first static mixer into at least one other mixer in which the temperature is below the boiling point of water;
    e) introducing water into the other mixer(s) in an amount such that the total amount of water present in the resulting emulsion is from 25 to 69.9% by weight based on the total weight of the emulsion; and
    f) passing the mixture through the other mixer(s) and removing the resulting bitumen emulsion.

9. A bituminous binder composition having a penetration of from 40 to 150 mm/10 (ASTM D5), a softening point from 60 to 120° C. (ASTM D36) and a kinematic viscosity at 160° C. of less than 250 mm2/s (ASTM D2170), the binder composition comprising from 88 to 99.5 wt % bitumen having a penetration of from 70 to 300 mm/10 and a softening point from 30 to 50° C., and from 0.5 to 12 wt % of an oxidised high density polyethylene wax having a melting point of 100° C. to 150° C. (ASTM D3418), a Brookfield dynamic viscosity at 150° C. of from 200 to 10,000 mPa.s, and an acid number of from 10 to 50 mg KOH/g (ASTM D1386).

* * * * *